US008907263B2

(12) United States Patent
Ohno

(10) Patent No.: US 8,907,263 B2
(45) Date of Patent: Dec. 9, 2014

(54) POSITION DETECTING DEVICE USING REFLECTION TYPE PHOTOSENSORS

(75) Inventor: Fumiaki Ohno, Fujimino (JP)

(73) Assignee: New Japan Radio Co., Ltd., Tokyo-to (JP)

( * ) Notice: Subject to any disclaimer, the term of this patent is extended or adjusted under 35 U.S.C. 154(b) by 65 days.

(21) Appl. No.: 13/277,528

(22) Filed: Oct. 20, 2011

(65) Prior Publication Data

US 2012/0097837 A1 Apr. 26, 2012

(30) Foreign Application Priority Data

Oct. 22, 2010 (JP) ................................. 2010-237482

(51) Int. Cl.
*G02B 27/40* (2006.01)
*G02B 7/182* (2006.01)
*G01B 11/02* (2006.01)

(52) U.S. Cl.
CPC .................... *G01B 11/026* (2013.01)
USPC ........................ 250/221; 250/201.2

(58) Field of Classification Search
CPC .. H04N 5/23212; G03F 9/7026; G02B 27/40; G11B 7/0909; G01J 1/44; G01J 1/04; H01J 40/14; H01L 27/14609; G01S 17/026; G01S 7/497; G01S 17/10; G01S 17/89; G01C 3/08
USPC .......... 250/221, 231, 551, 214 R, 214.1, 239, 250/237 R, 231.13, 201.2, 201.4–201.8; 33/707; 340/870.29; 396/89; 356/3–5.15

See application file for complete search history.

(56) References Cited

U.S. PATENT DOCUMENTS 5,061,071 A * 10/1991 Fujita et al. ................... 356/489
5,939,804 A 8/1999 Nakao
(Continued)

FOREIGN PATENT DOCUMENTS

CN 2000-234912 A 8/2000
CN 101772733 7/2010
(Continued)

OTHER PUBLICATIONS

First Office Action issued by the State Intellectual Property Office of People's Republic of China on Dec. 4, 2013 in counterpart application No. 201110320340.9.

(Continued)

*Primary Examiner* — Georgia Y Epps
*Assistant Examiner* — Carolynn A Moore
(74) *Attorney, Agent, or Firm* — Kratz, Quintos & Hanson, LLP

(57) ABSTRACT

There is provided a position detecting device using reflection type photosensors in which a position sensing of lens located not less than 1 mm apart from a sensor can be conducted.
A pair of reflection type photosensors PR1 and PR2 are oppositely arranged, a double sided reflector 5 attached on a movable body is movably arranged between the pair of reflection type photosensors and a position of the double sided reflector 5 is detected from the outputs of these reflection type photosensors. In the position detecting device of the present invention, an operating formula in which linear values are obtained depending on a moving distance of the double sided reflector can be used. For example, when an output of one of the pair of reflection type photosensors is Vo1, and an output of the other is Vo2, the position detecting is conducted using the operating formula of $(Vo1-Vo2)/(Vo1+Vo2)$.

6 Claims, 6 Drawing Sheets

(56) References Cited

U.S. PATENT DOCUMENTS

| | | |
|---|---|---|
| 6,353,473 B1 | 3/2002 | Ishimori et al. |
| 6,586,719 B1 * | 7/2003 | Bartzke et al. ............... 250/221 |
| 7,474,256 B2 * | 1/2009 | Ohta et al. ................... 342/146 |
| 7,573,021 B2 * | 8/2009 | Haber et al. ............. 250/227.14 |
| 7,667,186 B2 * | 2/2010 | Kauhanen ................ 250/231.13 |
| 2008/0296480 A1 | 12/2008 | Haber et al. |
| 2009/0026657 A1 | 1/2009 | Nimmakayala et al. |
| 2011/0026039 A1 | 2/2011 | Nimmakayala et al. |

FOREIGN PATENT DOCUMENTS

| | | |
|---|---|---|
| JP | 63-108219 A | 5/1988 |
| JP | 10-225083 | 8/1998 |
| JP | 11-289743 | 10/1999 |

OTHER PUBLICATIONS

Office Action issued Feb. 4, 2014 from the Japanese Patent Office in counterpart application No. 2010-237482.

* cited by examiner

PRIOR ART    FIG. 7
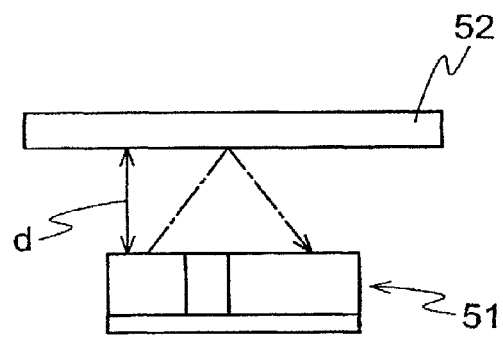
PRIOR ART    FIG. 8
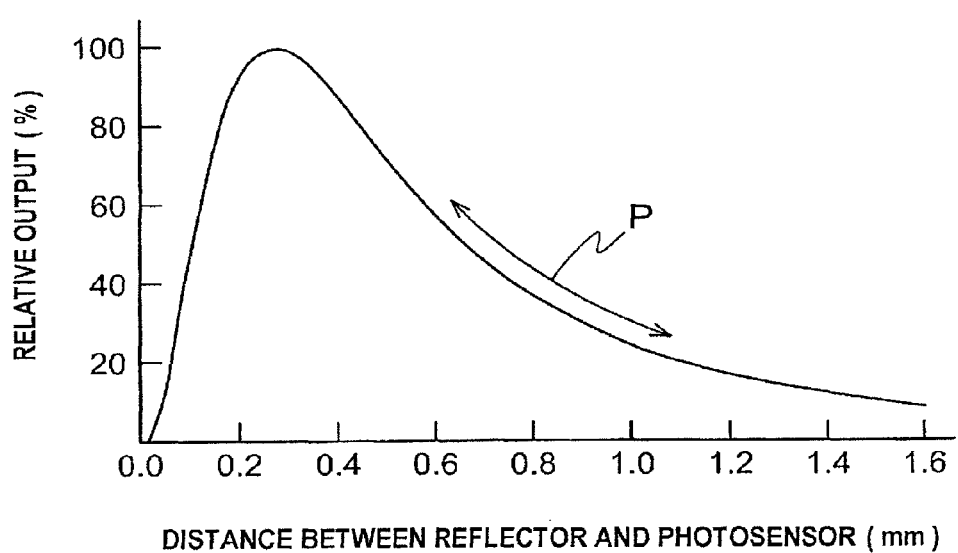

POSITION DETECTING DEVICE USING REFLECTION TYPE PHOTOSENSORS

TECHNICAL FIELD

The present invention relates to a position detecting device using reflection type photosensors, especially a device for detecting a position of a movable body (moving subject) in a device such as a camera.

BACKGROUND ART

Conventionally, in various cameras and cellular phones with cameras having zoom functions, a piezo motor or an actuator comprising a magnet and a coil together is used to drive a lens and a position detecting device (sensor) is used in order to determine a position of the movable lens or the like.

For example, as described in Patent Document 1 and 2, a device for detecting a lens located not less than 5 mm apart from a sensor using the above actuator is generally configured such that magnets are arranged over a plurality of magnetic sensors such as MR elements (magnetic resistive effect elements) or hall elements, and the magnets have a size covering these elements. Therefore, the device itself becomes large-scale. In an application in which such a position detecting device is used, when another component producing a magnetic field is used, the position detecting device can sometimes actuate incorrectly due to influence of interaction between the magnetic fields.

Therefore, it has been demanded to configure a position detecting device using a reflection type photosensor. In a conventional position detecting device using a reflection type photosensor, one reflection type photosensor is used on an actuator for detecting an autofocus lens of a cellular phone in order to detect a position of a lens located not more than 1 mm apart from the reflection type photosensor. For example, the configuration, as shown in FIG. 7, a reflection type photosensor 51 is provided with opposing to a mirror 52 fixed on a movable body; outputs of the reflection type photosensor 51 to distance d between the reflection type photosensor 51 and the mirror 52 (position of the movable body) are detected when the movable body moves, and are converted from analog data to digital data, and the relation of the outputs and the distance is stored in a memory; and a distance d of the movable body is measured by comparing the outputs of the reflection type photosensor 51 and the data of the memory. The relation of the distance d and the output of the reflection type photosensor 51 shows a curve line as shown in FIG. 8, for example. To obtain accurate values of the position of the movable body, parts with comparatively stable and significant difference (a part of the arrow P in FIG. 8) only can be used. Accordingly, a part with the distance d being comparatively shorter in which the output sharply changes (less than 0.5 mm of distance d) or a part with low sensitivity in which the output almost no changes (not less than 1.3 mm) can not be used to detect the accurate positions.

In other methods using a reflection type photosensor, the reflection type photosensor is arranged such that surfaces of a light emitting element and of a light receiving element of the reflection type photosensor are aligned parallel to a moving direction of the movable body, and then positions of edge parts of the movable body are measured. However, the method has similar sensitivity to the above method and can measure only about 1 mm or less.

PRIOR ART DOCUMENTS

Patent Documents

Patent Document 1: JP-10-225083A
Patent Document 2: JP-11-289743A

SUMMARY OF THE INVENTION

Problem to be Solved by the Invention

As described above, a detecting device for sensing a position of a moving subject located not less than 5 mm apart from a sensor using an actuator such as a piezo motor is composed of a magnetic sensor (MR element or hall element) and a large sized magnet. Therefore, down-sizing of the device was difficult. Additionally, in the case of the magnetic sensor, an output of each sensor is needed to input to an ADC (analog-to-digital converter) via an operational amplifier, or an output of an integrated circuit built-in sensor is needed to input to an ADC, which has led to more expensive cost for the parts for a system configuration.

In the case where the position sensing of a lens located not less than 1 mm apart from the sensor is conducted using one reflection type photosensor, the device is arranged, for example, so that a movable body moves parallel to a direction of a line to connect a light emitting element and a light receiving element of the reflection type photosensor. Therefore, there is a problem that a size of the light receiving element in the moving direction of a movable body becomes larger than the moving distance of the movable body to be detected, which leads to an increase in the outer size of a reflection type photosensor.

During detecting a position using a reflection type photosensor, the photosensor has a thermal property in which the detected outputs vary depending on the temperature variations, and therefore, it is required to eliminate the influence of such thermal property. For that purpose, in a conventional device, for example, a feedback control circuit for monitoring temperatures by a thermistor or a circuit for canceling thermal property of a reflection type photosensor is provided in the device and temperature variations are set off.

The present invention was made in light of the foregoing and the objective thereof is to provide a position detecting device using a reflection type photosensor not using a magnetic sensor or a large-sized magnet, having a simple and down-sized configuration and being suitable for position sensing of a lens located not less than 1 mm apart from the sensor.

Another object of the present invention is to provide a position detecting device using a reflection type photosensor which is capable of canceling the thermal property of the reflection type photosensor.

Means for Solving Problem

To achieve the above objectives, the position detecting device using a reflection type photosensor according to the present invention comprises a pair of reflection type photosensors oppositely arranged, a double sided reflector which is arranged between the pair of reflection type photosensors and vertically fixed to a moving direction of a movable body, and an operating circuit for at least processing adding and/or subtracting outputs of the pair of reflection type photosensors.

Further, the device comprises a comparator circuit for comparing outputs of the operating circuit with the reference data, the reference data being results previously obtained on a relation between outputs of the operating circuit, thereby the position of the movable body can be obtained by the comparison in the comparator circuit.

It is preferable that the operating circuit comprises an adding circuit for calculating sum of outputs of the pair of reflection type photosensors, a subtracting circuit for calculating a difference of outputs of the pair of reflection type photosensors and a dividing circuit for calculating a ratio of an output of the subtracting circuit. Since a sum and a difference of the pair of reflection type photosensors can be calculated, even if an interval between one of the pair of reflection type photosensors and the double sided reflector is larger and thereby the output of the reflection type photosensor is smaller, the output of the other reflection type photosensor is larger and the sum and difference thereof are larger. In the output of the dividing circuit, a part of the linear property thereof is preferable, since the reference data can be obtained from the proportional relation without previously detecting in a very small interval the relation between outputs of the operating circuit and positions of the movable body. Further, since outputs of a first and second reflection type photosensors constituting the pair of reflection type photosensors are contained in a denominator and a numerator, respectively, output fluctuation factors based on external temperature or the like are cancelled in outputs of dividing circuit. That is, even if the temperatures of the reflection type photosensors change and thereby outputs thereof fluctuate, the tendency of fluctuations is similar in the first and the second reflection type photosensors and therefore, the fluctuations can be offset by dividing the outputs.

For example, the ratio obtained in the dividing circuit is represented by (Vo1−Vo2)/(Vo1+Vo2), provided that the outputs of the pair of reflection type photosensors are Vo1 and Vo2, respectively. Thereby, even if the distance is longer, i.e. about 1.5 to 6.5 mm, the relation between the outputs and the distances is almost linear. As the result, the accurate position of the movable body can be easily calculated.

Effects of the Invention

The position detecting device using a reflection type photosensor of the present invention comprises the double sided reflector fixed on the movable body and each reflection type photosensor arranged on both sides of the double sided reflector. Therefore, for example, while a position of the double sided reflector is far from one of the reflection type photosensors, which leads to a smaller output thereof, the position comes near the other of the refection type photosensors, which leads to a larger output of the other reflection type photosensor. Therefore, calculations of sums or differences of outputs of both reflective photosensors make it possible to detect a position of a movable body widely. Consequently, by using the output voltages (or currents) of the pair of reflection type photosensors oppositely arranged, and the arithmetic expression representing a linear distance property, the device can b down-sized, and inexpensive and high sensitive position detecting without using a magnetic sensor or a large sized magnet. The device can be used for position detecting of a lens of a camera module requiring a zoom function such as a digital still camera, a cellular phone with a camera having a zoom function, a single-lens reflex camera and a camcorder, and can be advantageously used in an actuator for driving a lens requiring a position detecting of a lens located far away, about 1 mm to 10 mm.

By using outputs of the two reflection type photosensors, i.e. adding and subtracting the two outputs, further dividing the values obtained by adding or subtracting, the outputs of two reflection type photosensors can be represented by ratios and influences caused by temperatures at similar ratio can be offset with each other. Consequently, it is advantageous that a feedback control circuit which offsets temperature fluctuations monitored by, for example, a conventional thermistor and a circuit for canceling the thermal property of a reflection type photosensor need not be provided.

BRIEF EXPLANATION OF THE DRAWINGS

FIG. 7 is a schematic view showing a conventional device for detecting a position using a reflection type photosensor.

FIG. 8 is a view showing outputs of the reflection type photosensor in FIG. 7.

DETAILED DESCRIPTION

Figure 1:
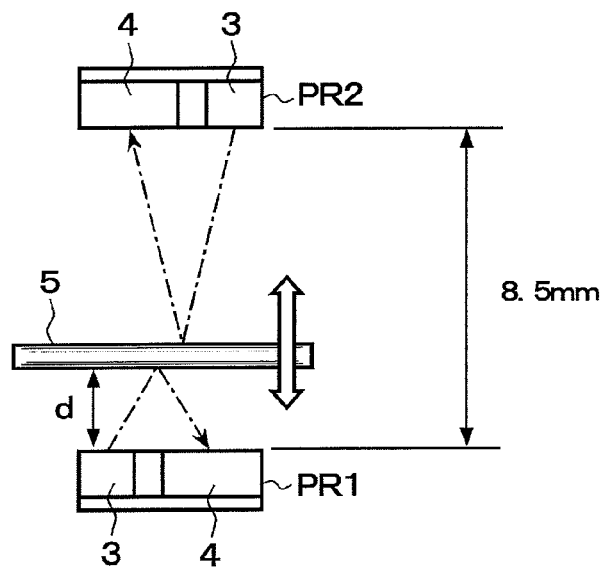
FIG. 1 is a view showing a configuration of a sensor unit of a position detecting device according to an embodiment of the present invention.

FIG. 1 shows a configuration of a sensor unit in one embodiment of a position detecting device using a reflection type photosensor of the present invention, and for example, a pair of (two) reflection type photosensors PR1 and PR2 are oppositely arranged and fixed at an interval of 8.5 mm. Each of the pair of reflection type photosensors PR1 and PR2 has a light emitting element 3 and a light receiving element 4, respectively. A double sided reflector 5 which is fixed on an movable body, not shown, in an arrangement of being perpendicular to a moving direction and both surfaces thereof are formed in reflectors (e.g. thickness t=0.5 mm). That is arranged between the reflection type photosensors PR1 and PR2. The double sided reflector 5 is formed so as to have almost the same reflection ratio with each other in the both surfaces. Their areas are formed so as to be larger than the areas of the surfaces of the reflection type photosensors PR1 and PR2. The double sided reflector 5, as described above, is connected with the movable body such as a lens and configured so as to move between the reflection type photosensors integrally with the movable body.

Figure 2:
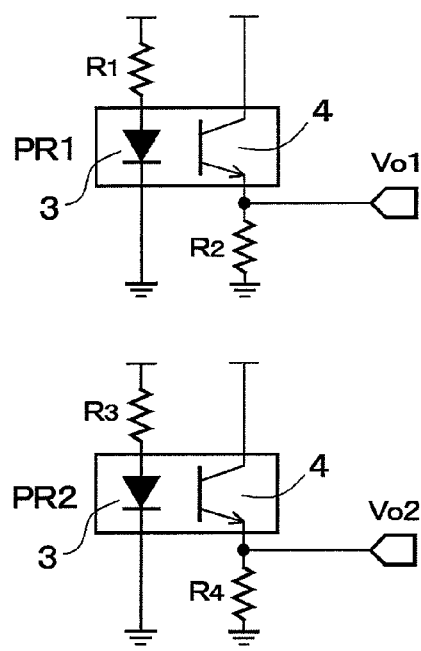
FIG. 2 is a view showing a circuit configuration of sensor unit of the position detecting device according to the above embodiment.

FIG. 2 shows a circuit configuration of the sensor unit and, as illustrated, the reflection type photosensor PR1 includes a resistor $R_1$, a light emitting element (light emitting diode) 3, a light receiving element (phototransistor) 4 and a resistor $R_2$. Light emitted from the light emitting element 3 is reflected at the double sided reflector 5 and the reflected light is returned and received by the light receiving element 4. And, currents flow in the light receiving element 4 and a voltage Vo1 (or current) is output via the resistor $R_2$. That is, in the case where a distance between the reflection type photosensor PR1 and the double sided reflector 5 is shorter, strong light is reflected and the reflected strong light is received by the light receiving element 4. As a result, large currents flow and the output voltage Vo1 also becomes larger. On the other hand, in the case where a distance between the reflection type photosensor PR1, and the double sided reflector 5 is longer, light emitted from the light emitting element 3 is dispersed and concurrently attenuated. Subsequently the weaker light is received at the light receiving element 4 and therefore, the current and also the output voltage Vo1 are smaller. The reflection type photosensor PR2 also includes a resistor $R_3$, a light emitting element 3, a light receiving element 4 and resistor $R_4$, and is arranged so as to output the voltage Vo2 in the case where the reflected light is received at the light receiving element 4. Light values (outputs) emitted from each light emitting element 3 of both reflection type photosensors PR1 and PR2 are almost the same value as each other, but it is not always necessary to be the same.

Figure 3:
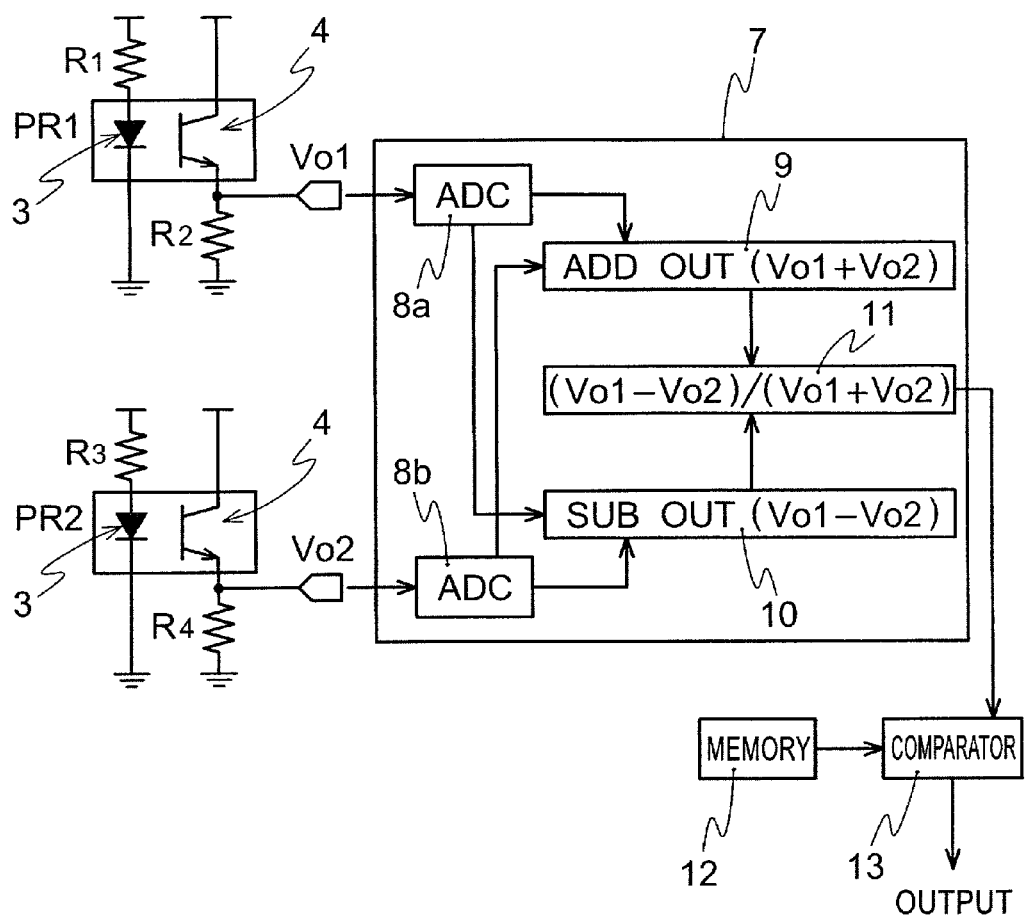
FIG. 3 is a view showing a connection between the sensor unit and an operating unit in the embodiment of the position detecting device of the present invention.

FIG. 3 shows a configuration of a position detecting device including an operating circuit. The operating circuit 7 is composed of ADCs (analog-to-digital converter) 8a and 8b to which output voltages Vo1 and Vo2 detected at a detection unit are input, an adding circuit 9 calculating Vo1+Vo2, a subtracting circuit 10 calculating Vo1−Vo2 and a dividing circuit 11 calculating (Vo1−Vo2)/(Vo1+Vo2) or (Vo1+Vo2)/(Vo1−Vo2).

In the event of detecting a position actually, a relation between positions and data of outputs of the operating circuit by digital data is firstly obtained at each position of the double sided reflector 5 of the position detecting device. And the relation is stored on digital data as reference data in a memory 12. Then, detecting Vo1 and Vo2 when the double sided reflector 5 is in a point, and calculating (Vo1−Vo2)/(Vo1+Vo2), for example, in the operating circuit 7, and comparing the operated data and the stored reference data in the comparator circuit 13. It leads to detect a position of the double sided reflector 5, i.e. a position of the movable body immediately by obtaining the position when the operated data is the same as the reference data.

Figure 4:
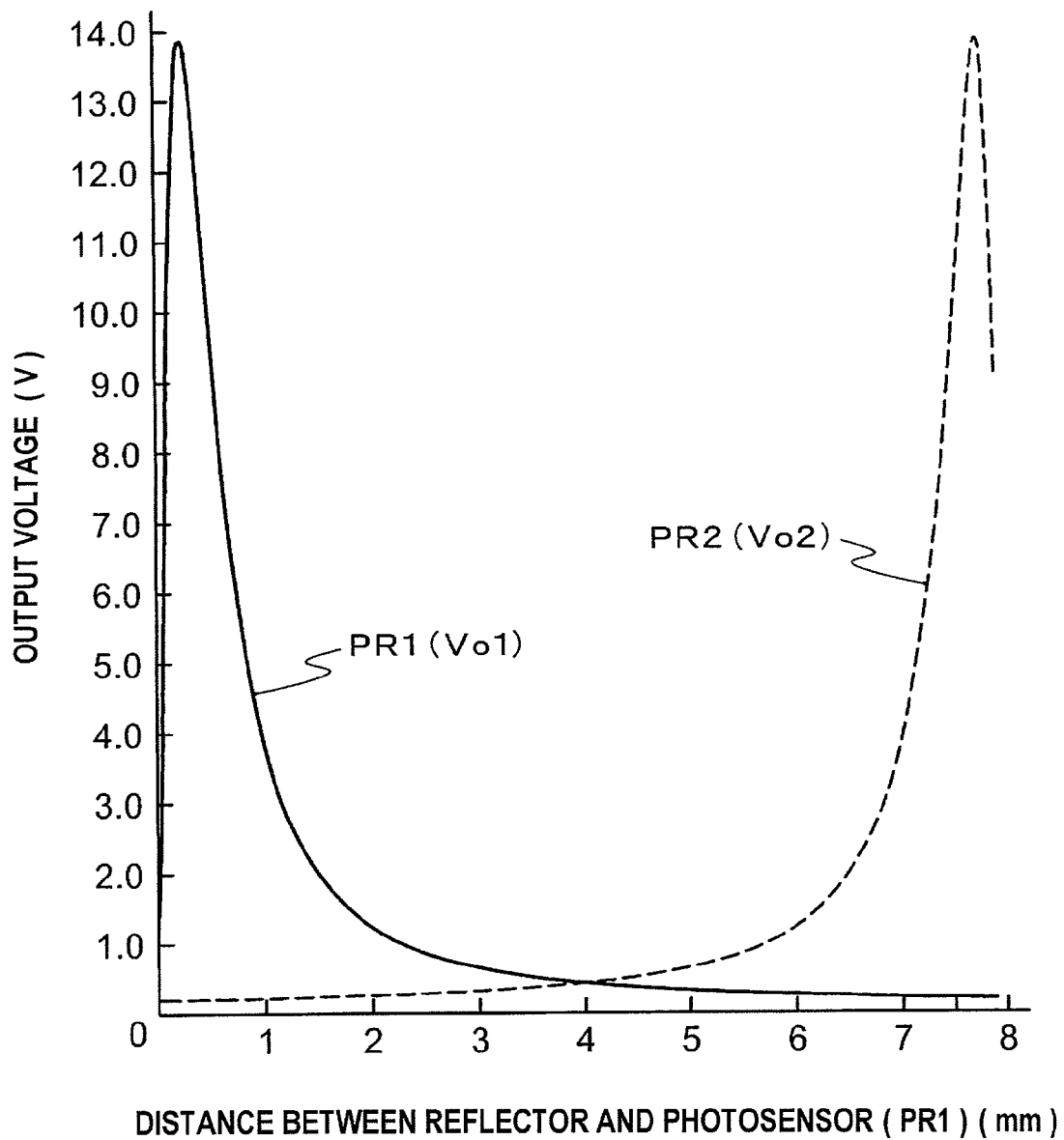
FIG. 4 is a characteristic graph showing a relation between outputs of each of the reflection type photosensors according to the embodiment of the present invention and distances between a position of one of reflection type photosensors and a double sided reflector.

Here, operations of the position detecting device will be explained. FIG. 4 shows a relation between the output voltages Vo1 and Vo2 of the reflection type photosensors PR1 and PR2 and a distance d in the range of 0 mm≤d≤8 mm, where d is a distance from a surface of the double sided reflector 5 which is provided between the reflection type photosensors PR1 and PR2 to one surface of the reflection type photosensor PR1. When a distance d from the reflection type photosensor PR1 becomes longer, the output voltage Vo1 of the reflection type photosensor PR1 rapidly decreases from higher voltage, while a distance between the reflection type photosensor PR2 and the double sided reflector 5 (8.5−d−0.5 (which is a thickness of the double sided reflector 5)) becomes shorter and therefore, the output voltage Vo2 of the other reflection type photosensor PR2 rapidly increases from a low voltage. Thus, each voltage has a symmetric relation each other.

Figure 5:
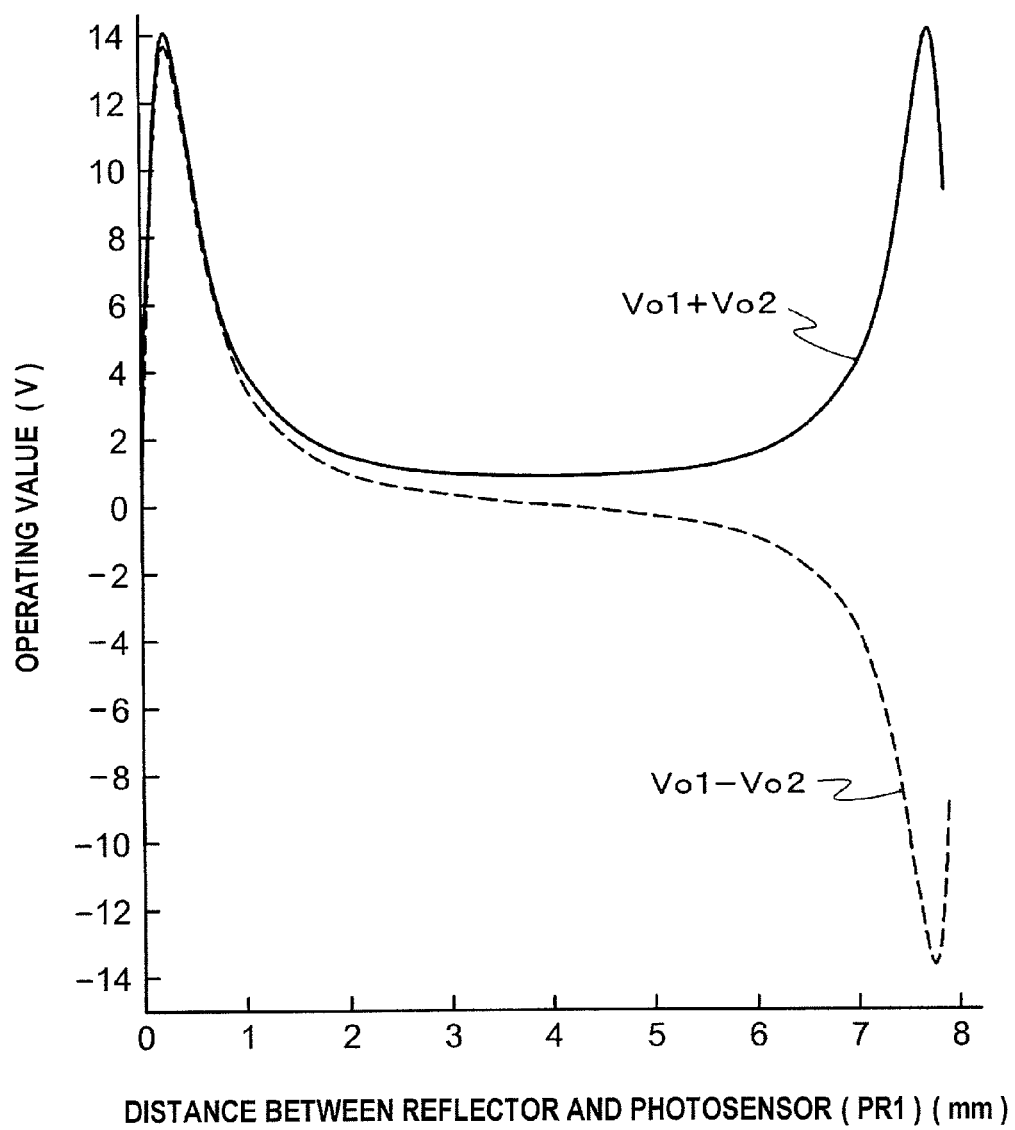
FIG. 5 is a graph showing each output of an adding circuit and a subtracting circuit for outputs of the pair of reflection type photosensors in the embodiment of the present invention vs. the positions of the double sided reflector.

FIG. 5 shows a relation between a distance and an operating value in which an operating processing of adding (Vo1+Vo2) and subtracting (Vo1−Vo2) are conducted on the digital data for the output voltage Vo1 of the reflection type photosensor PR1 and the output voltage Vo2 of the photosensor PR2, as explained in FIG. 4, at the above adding circuit 9 and the subtracting circuit 10.

Figure 6:
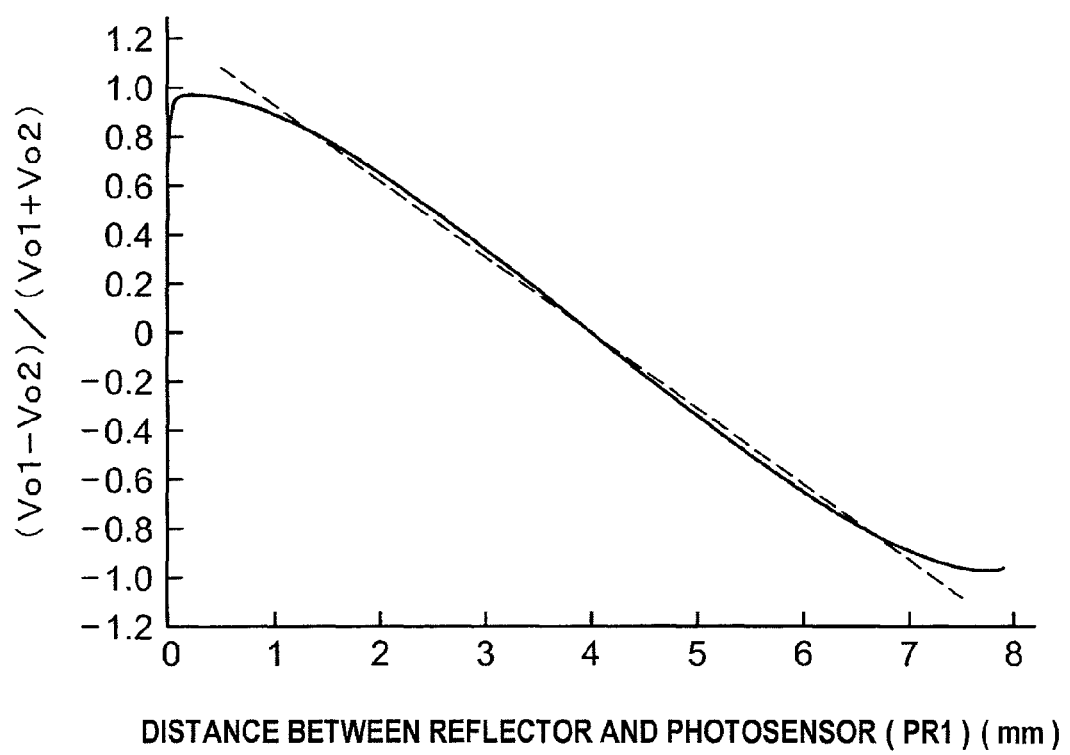
FIG. 6 is a graph showing an operating values obtained by dividing outputs (Vo1−Vo2) of the subtracting circuit by outputs (Vo1+Vo2) of the adding circuit shown in FIG. 4 vs. the positions of the double sided reflector.

FIG. 6 shows a relation between an operating value and distance. The operating value is obtained with dividing in the dividing circuit 11 a value calculated in the subtracting circuit 10 by a value calculated in the adding circuit 9, that is, (Vo1−Vo2)/(Vo1+Vo2) [operating formula A]. According to the operating formula A, as shown, it is found that a linear characteristic with high linearity which is closely comparable to an ideal straight line shown by a dot line is obtained. It is preferable to use parts of such good linearity, because reference data are obtained from a proportional relation between distance d and output, and stored, even though the tight data in the interval are not detected. However, a poor part of linearity can be used by detecting more data with more tight (short) interval of d than the interval in the case of good linearity, storing the detected data as the reference data. And the reference data can be compared with the operating values at the time of measurement. Therefore, as described above, the positions can be detected at distances (interval) of about 1 to 10 mm.

In operating formula for obtaining the position (Vo1+Vo2)/(Vo1−Vo2), [operating formula B] may be used. Even in this case, both of Vo1 and Vo2 are contained in a numerator and a denominator in the operating formula B and therefore, the effect of fluctuations based on temperature or the like can be canceled. However, in the operating formula B, as there is a case wherein the denominator is 0, i.e. the calculated value of the formula B is infinity, the graph leads to a hyperbolic curve or the like and therefore, the linearity is poor. Thus, in this case, similar to poor parts of linearity of the operating formula A, it is necessary that data of the output Vo1 and Vo2 is taken at tight intervals and each data is stored as reference data. In the above operating formulas A and B, as explained below, the effect of fluctuations can be canceled even if output values are varied based on thermal properties of the reflection type photosensors PR1 and PR2.

Output voltages of the reflection type photosensors PR1 and PR2, which are bases of these graphs and are measured at different positions of the double sided reflector 5, and calculated results by each operating circuit 9, 10 and 11 are collectively shown in table 1. FIGS. 4 to 6 graphically show the table.

TABLE 1

| d (mm)        | 0.5   | 1    | 2    | 3    | 4    | 5     | 6     | 7     | 7.5   |
|---------------|-------|------|------|------|------|-------|-------|-------|-------|
| (1) Vo1       | 9.85  | 3.85 | 1.23 | 0.65 | 0.43 | 0.32  | 0.26  | 0.22  | 0.21  |
| (2) Vo2       | 0.21  | 0.22 | 0.26 | 0.32 | 0.43 | 0.65  | 1.23  | 3.85  | 9.85  |
| (3) Vo1 − Vo2 | 9.64  | 3.63 | 0.97 | 0.33 | 0    | −0.33 | −0.97 | −3.63 | −9.64 |
| (4) Vo1 + Vo2 | 10.06 | 4.07 | 1.49 | 0.97 | 0.86 | 0.97  | 1.49  | 4.07  | 10.06 |
| (5) (3)/(4)   | 0.96  | 0.89 | 0.65 | 0.34 | 0    | −0.34 | −0.65 | −0.89 | −0.96 |

In the above examples, a distance of both photosensors is 8 mm (the thickness of the double sided reflector 5 is 0.5 mm) and in the distance of 1.5 to 6.5 mm which is the distance from PR1 to the double sided reflector 5, better linearity is obtained. For example, as described above, even if data are obtained at intervals of 1 mm, data therebetween can be expected from the proportional relation and the reference data can be stored in the memory. However, in more sensitively detecting position, data is taken at a shorter interval, for example, at about 100 μm, reference data are obtained by calculating from the detected data and the reference data are stored in a memory 12. As a result, more detail detection of the position can be realized.

As described above, even in poor parts of linearity of FIG. 6 (e.g. d=1 to 1.5 mm or d=6.5 to 7.5 mm), the detection can be conducted by obtaining the reference data at a shorter interval than that in the case of the good parts of linearity and storing the obtained reference data. When the distance between a pair of reflection type photosensors PR1 and PR2 is about 3 mm or 5 mm, good parts of the linearity are short. In the case of about 10 mm of the distance, the distance of lower parts of output of both of the reflection type photosensors PR1 and PR2 is longer, i.e. a part with lower change rate of outputs of both of the reflection type photosensors PR1 and PR2 is longer. That is not preferred because good parts of the linearity are smaller, however, similarly to the above case, the detection can be conducted by obtaining the reference data at a shorter interval and storing the obtained reference data. Thus, the detection can be conducted even at 1 to 10 mm of intervals, however, in the case of 1.5 to 6.5 mm of the distance, good linearity is obtained and the detection can be conducted in very simple and accurate manner.

In such a configuration, a pair of reflection type photosensors PR1 and PR2 sandwich the movable double sided reflector 5 in FIG. 1 and are provided oppositely each other. Light from each light emitting element 3 of a pair of reflection type photosensors PR1 and PR2 is emitted and then the light reflected from the double sided reflector 5 is received at each light receiving element 4. Subsequently, the voltage Vo1 from the reflection type photosensor PR1 and the voltage Vo2 from the reflection type photosensor PR2 are output, respectively. These analog voltage values are converted to digital values at ADCs 8a and 8b, and for example, (Vo1−Vo2)/(Vo1+Vo2) [operating formula A] are calculated by the adding circuit 9, the subtracting circuit 10 and the dividing circuit 11 to which these digital values are input. Based on this calculated value and the reference data shown in FIG. 6 which is previously prepared and stored, the position of the double sided reflector 5 (distance d), i.e. the position of the movable body is successfully detected.

The device in the above Embodiments can be used in a lens position detecting device of camera modules requiring zoom functions such as a digital still camera, a cellular phone with a camera having a zoom function, a single-lens reflex camera and a camcorder as a position detecting device incorporating a piezo actuator. In the position sensing of a lens located not less than 1 mm apart from the sensor, a down-sizing and inexpensive system configuration can be advantageously realized.

In the case where output voltages varied depending on temperatures based on thermal properties of the reflection type photosensors PR1 and PR2, the effect of the fluctuations are completely cancelled according to the above adding and subtracting as well as dividing processing based on outputs of two reflection type photosensors. That is, the thermal properties appeared at a constant rate, and according to the present invention, operating processing in which values detected by the light receiving element 4 are contained in the denominator and the numerator is conducted and therefore, fluctuations by the thermal properties can be offset. For example, in the case where there is no influence due to temperature, and Vo1=0.4 (V) and Vo2=0.1 (V), the value obtained from the above operating formula A is 0.6. In contrast, in the case where the fluctuation of 10% up produces by influence due to temperature, Vo1=0.44 and Vo2=0.11, the calculated value is 0.6 and the fluctuation thereof are cancelled. Thus, the circuit for monitoring temperatures in the device with a thermistor and feeding back, and the circuit for canceling thermal properties of the reflection type photosensor need not to be provided.

EXPRESSION OF REFERENCE CODES

PR1, PR2 Reflection type photosensor
3 Right emitting element
4 Right receiving element
5 Double sided reflector
7 Operating circuit
8a, 8b ADC
9 Adding circuit
10 Subtracting circuit
11 Dividing circuit
12 Memory
13 Comparator circuit

The invention claimed is:

1. A position detecting device for detecting a position of a movable body using reflection type photo sensors, comprising
a pair of reflection type photosensors oppositely arranged, each of the pair of reflection type photosensors having a light emitting element and a light receiving element that receives a returned light, the returned light being a light which is emitted by the light emitting element and reflected by a reflecting material,
a reflecting plate having a reflective plane on both surfaces arranged between the pair of reflection type photosensors, the reflecting plate being fixed to the movable body such that one of the reflective planes is opposite to one of the pair of reflection type photosensors and the other of the reflective planes is opposite to the other of the pair of reflection type photo sensors, and the reflective planes are perpendicular to a moving direction of the movable body, and
an operating circuit for at least conducting at least one adding processing and subtracting processing of outputs of the receiving element corresponding to a distance between one of the pair of reflection type photosensors and one of the reflective planes opposing thereto and output of the receiving element corresponding to a distance between the other of the pair of reflection type photosensors and the other of the reflective planes opposing thereto.

2. The position detecting device using the reflection type photosensors according to claim 1, further comprising
a comparator circuit for comparing outputs of the operating circuit with a reference data, the reference data being results previously obtained on a relation between outputs of the operating circuit and positions of the movable body,
whereby, the position of the movable body is determined by the comparison in the comparator circuit.

3. The position detecting device using the reflection type photo sensors according to claim 1, wherein the operating circuit comprises an adding circuit for calculating the sum of outputs of the pair of reflection type photo sensors, a subtracting circuit for calculating a difference of outputs of the pair of reflection type photosensors and a dividing circuit for calculating a ratio of an output of the subtracting circuit and an output of the adding circuit.

4. The position detecting device using the reflection type photosensors according to claim 2, wherein the operating circuit comprises an adding circuit for calculating the sum of outputs of the pair of reflection type photosensors, a subtracting circuit for calculating a difference of outputs of the pair of reflection type photosensors and a dividing circuit for calculating a ratio of an output of the subtracting circuit and an output of the adding circuit.

5. The position detecting device using the reflection type photosensors according to claim 1, wherein the operating circuit includes a dividing circuit for calculating a ratio represented by (Vo1−Vo2)/(Vo1+Vo2), where the outputs of the pair of reflection type photosensors are Vo1 and Vo2, respectively.

6. The position detecting device using the reflection type photosensors according to claim 2, wherein the operating circuit includes a dividing circuit for calculating a ratio represented by (Vo1−Vo2)/(Vo1+Vo2), where the outputs of the pair of reflection type photosensors are Vo1 and Vo2, respectively.

* * * * *